(12) United States Patent
Zhang et al.

(10) Patent No.: US 12,507,877 B2
(45) Date of Patent: Dec. 30, 2025

(54) SUSPENSION DEVICE AND CAPSULE ENDOSCOPE MAGNETIC CONTROL SYSTEM

(71) Applicants: Ankon Medical Technologies (Shanghai) Co., LTD., Shanghai (CN); ANX IP HOLDING PTE. LTD., Singapore (SG)

(72) Inventors: Shaobang Zhang, Shanghai (CN); Yueyue Shen, Shanghai (CN)

(73) Assignees: ANKON MEDICAL TECHNOLOGIES (SHANGHAI) CO., LTD., Shanghai (CN); ANX IP HOLDING PTE. LTD, Singapore (SG)

( * ) Notice: Subject to any disclaimer, the term of this patent is extended or adjusted under 35 U.S.C. 154(b) by 453 days.

(21) Appl. No.: 18/012,907

(22) PCT Filed: Jun. 23, 2021

(86) PCT No.: PCT/CN2021/101803
§ 371 (c)(1),
(2) Date: Dec. 23, 2022

(87) PCT Pub. No.: WO2021/259320
PCT Pub. Date: Dec. 30, 2021

(65) Prior Publication Data
US 2023/0255458 A1   Aug. 17, 2023

(30) Foreign Application Priority Data

Jun. 23, 2020   (CN) .......................... 202010581403.5

(51) Int. Cl.
A61B 1/04      (2006.01)
A61B 1/00      (2006.01)
A61B 1/045     (2006.01)

(52) U.S. Cl.
CPC .......... *A61B 1/041* (2013.01); *A61B 1/00158* (2013.01); *A61B 1/045* (2013.01)

(58) Field of Classification Search
None
See application file for complete search history.

(56) References Cited

U.S. PATENT DOCUMENTS 3,638,973 A * 2/1972 Poletti .................... A61B 17/02
                                                    285/306
3,703,842 A * 11/1972 Yarlott ..................... B30B 1/00
                                                    100/269.03
(Continued)

FOREIGN PATENT DOCUMENTS

CN          103222842 A      7/2013
CN          204986740 U      1/2016
(Continued)

*Primary Examiner* — Anh Tuan T Nguyen
*Assistant Examiner* — Jae Woo
(74) *Attorney, Agent, or Firm* — Treasure IP Group, LLC

(57) ABSTRACT

A suspension device and a capsule endoscope magnetic control system are provided. The suspension device includes a base, including a pairing portion; a suspension member, at least part of the suspension member is disposed within the base; an intermediate member, which is disposed on an upper end of the suspension member; and an adsorption component, which is disposed above the intermediate member. When the adsorption component has no adsorption force, the intermediate member is pressed against the upper end of the suspension member so that at least part of the suspension member abuts against the pairing portion and the suspension member is locked. When the adsorption component has the adsorption force, the intermediate member is driven to move vertically so that at least part of the suspension member is separated from the pairing portion and a posture of the suspension member is appropriate for adjustment.

19 Claims, 2 Drawing Sheets

(56) References Cited

U.S. PATENT DOCUMENTS

| | | | | |
|---|---|---|---|---|
| 3,712,570 | A * | 1/1973 | Stone | F25D 23/10 |
| | | | | 248/176.1 |
| 4,214,724 | A * | 7/1980 | Geiger | F16M 11/22 |
| | | | | 248/167 |
| 4,768,744 | A * | 9/1988 | Leeds | F16M 11/14 |
| | | | | 248/921 |
| 5,681,260 | A * | 10/1997 | Ueda | A61B 1/00082 |
| | | | | 600/117 |
| 5,738,344 | A * | 4/1998 | Hagman | F16M 11/14 |
| | | | | 269/20 |
| 2002/0000503 | A1* | 1/2002 | Fidler | F16C 11/106 |
| | | | | 403/90 |
| 2003/0138289 | A1* | 7/2003 | Ronsheim | F16M 11/14 |
| | | | | 403/90 |
| 2005/0154294 | A1* | 7/2005 | Uchiyama | A61B 1/0676 |
| | | | | 600/420 |
| 2007/0244388 | A1* | 10/2007 | Sato | A61B 1/041 |
| | | | | 600/550 |
| 2018/0187828 | A1* | 7/2018 | Law | F16M 11/125 |
| 2019/0093702 | A1* | 3/2019 | Tiefenbrunn | F16C 11/106 |

FOREIGN PATENT DOCUMENTS

| | | | |
|---|---|---|---|
| CN | 105486883 | A | 4/2016 |
| CN | 105588947 | A | 5/2016 |
| CN | 105615817 | A * | 6/2016 |
| CN | 105699679 | A | 6/2016 |
| CN | 105717324 | A | 6/2016 |
| CN | 105738646 | A | 7/2016 |
| CN | 105962876 | A | 9/2016 |
| CN | 108408393 | A | 8/2018 |
| CN | 110809426 | A | 2/2020 |
| JP | 2004052911 | A | 2/2004 |
| JP | 3215784 | U | 4/2018 |

\* cited by examiner

SUSPENSION DEVICE AND CAPSULE ENDOSCOPE MAGNETIC CONTROL SYSTEM

CROSS-REFERENCE OF RELATED APPLICATIONS

The application is a National Phase Application of PCT International Application No. PCT/CN2021/101803, International Filing Date Jun. 23, 2021, published Dec. 30, 2021 as International Publication Number WO2021/259320A1, which claims priority from Chinese Patent Application No. 202010581403.5, filed Jun. 23, 2020, all of which are incorporated herein by reference in their entirety.

FIELD OF INVENTION

The present invention relates to the field of medical devices, and more particularly to a suspension device and a capsule endoscope magnetic control system.

BACKGROUND

Currently, using magnetically controlled capsule endoscopy for routine examination of human digestive tract is one of advanced diagnostic means available on market. For controlling capsule endoscopes, an external drive method can be used. It is a control method that provides driving forces for moving capsule endoscope in vivo through an in vitro device. That is, an external magnetic control technique can be used to locate and navigate the capsule endoscope in vivo.

Existing control means of capsule endoscopy include using a magnetic control device outside the human body, which can provide a controllable variable magnetic field to drive the in vivo capsule endoscope to move, resulting in a change in the field of view for the magnetically controlled capsule endoscope. At present, most of magnetic control systems on market are fixedly installed in a certain area of a consulting room, and a connection between the magnetic control device and a main body of the magnetic control system is generally a rigid connection.

In order to provide convenience to some patients, in view of a fact that patients with mobility impairments in hospitals also need to have endoscopic examinations, there is a certain market demand for a mobile magnetic control system. However, the existing mobile magnetic control system still has more or less problems. For example, one of the problems to be overcome by the existing mobile magnetic control system is that the magnetic control device in the mobile magnetic control system needs to overcome a tilt problem caused by uneven ground in different environments. That is to say, due to the influence of environment or other factors in the process of changing operating environment of the existing mobile magnetic system, the magnetic control device may be tilted or not perpendicular to a local horizontal plane, so that the stability between the magnetic control device and the main body of the magnetic control system cannot be guaranteed during an examination, thus affecting the examination or results.

Therefore, the present invention is submitted.

SUMMARY OF THE INVENTION

An objective of the present invention is to provide a suspension device and a capsule endoscope magnetic control system, which has a simple structure, is easy to operate and can adjust a posture of a hanging object, so that the hanging object can adapt to changes in different environments, and can overcome above problems or at least partially solve the above problems.

To achieve the above objective, the technical solution used in the present invention is:

According to one aspect of the present invention, it is provided a suspension device, comprises:
  a base, comprising a pairing portion;
  a suspension member, wherein at least part of the suspension member is disposed within the base;
  an intermediate member, which is pressed at an upper end of the suspension member; and
  an adsorption component, which is disposed above the intermediate member;
  wherein, when the adsorption component has no adsorption force, the intermediate member is pressed against the upper end of the suspension member so that at least part of the suspension member abuts against the pairing portion and the suspension member is locked; when the adsorption component has an adsorption force, the intermediate member is driven to move vertically so that at least part of the suspension member is separated from the pairing portion and a posture of the suspension member is appropriate for adjustment.

In one embodiment, the suspension device comprises at least one elastic member, and the at least one elastic member applies an elastic force on the intermediate member such that the suspension member and the pairing portion abut against each other.

When the adsorption component has no adsorption force, the elastic force of the elastic member is fit for driving the intermediate member to press against the upper end of the suspension member; when the adsorption component has the adsorption force, the adsorption force overcomes the elastic force of the elastic member and drives the intermediate member to move vertically.

In one embodiment, the suspension device comprises a guide mechanism, the guide mechanism comprising a guide rod, the guide rod is sleeved with the elastic member.

The intermediate member is fit for moving along an axial direction of the guide mechanism.

Optionally, the elastic member comprises a variety of elastic elements that provides elastic force, comprise a spring, a compression spring, a wire spring, a torsion spring, a leaf spring, or a spring piece.

Optionally, two elastic members are provided. The two elastic members are distributed on both sides of the adsorption component, and the two elastic members are respectively sleeved on the two guide rods.

In one embodiment, the suspension device comprises a guide mechanism. The guide mechanism comprises a guide rod and sliding seat. The sliding seat is disposed on the intermediate member and is mounted on the guide rod, wherein the sliding seat is slidably connected to the guide rod.

The intermediate member and the sliding seat are fit for moving linearly along an axial direction of the guide rod.

In one embodiment, the sliding seat comprises a linear bearing.

In one embodiment, the suspension device comprises a fixing member that is connected to the base to form a holding cavity. The adsorption component, the intermediate member and at least part of the suspension member are arranged in the holding cavity, and the adsorption component is fixedly mounted on the fixing member.

Optionally, the base is connected to the fixing member by screws.

In one embodiment, an upper end of the guide rod is connected to the fixing member, and a bottom end of the guide rod passes through the intermediate member and is connected to the base.

In one embodiment, the suspension member comprises a ball bar and a ball head, wherein one end of the ball bar is provided with the ball head and the other end of the ball bar extends outside the base.

The ball head is at least partially disposed in the base and the intermediate member is pressed against an upper end of the ball head.

In one embodiment, the pairing portion of the base is a ball groove, and the ball head is at least partially located in the ball groove.

Alternatively, the pairing portion of the base is a stepped groove or a stepped hole, and the upper portion of the stepped groove or the stepped hole can fit an outer surface of a lower portion of the ball head.

The suspension member and the base form a ball hinge structure, that is, the ball hinge structure comprises a suspension member and a base, wherein, the suspension member comprises a ball head and a ball bar (is referred to as a ball hinge bar), and the base is referred to as a hinge base or a ball hinge base, and the base is provided with a ball groove that fits with the ball head, and the ball head of the suspension member and the ball groove of the base form a constraint.

In one embodiment, the adsorption component comprises an electromagnetic chuck, and the electromagnetic chuck has the adsorption force when energized and has no adsorption force when de-energized.

In one embodiment, an upper end of the electromagnetic chuck is connected to the fixing member, and a bottom end of the electromagnetic chuck is close to an upper end surface of the intermediate member.

Optionally, the upper end of the electromagnetic chuck is connected to the fixing member by screws.

In one embodiment, the electromagnetic chuck is connected to an external power supply or a power button through an energized cable.

In one embodiment, the suspension device further comprises an elastic member, a guide mechanism and a fixing member, and the guide mechanism comprises a guide rod and a sliding seat.

The base is connected to the fixing member to form a holding cavity. The intermediate member, the adsorption component, the elastic member, the guide mechanism and part of the suspension member are all arranged in the holding cavity, and a remaining part of the suspension member is fit for extending outside the holding cavity through the pairing portion.

The adsorption component is disposed above the intermediate member, the intermediate member is pressed at the upper end of the suspension member, the intermediate member is provided with the sliding seat, and the sliding seat is mounted on the guide rod, the sliding seat is slidably connected to the guide rod, and the guide rod is sleeved with the elastic member.

In one embodiment, an upper end of the adsorption component is fixedly connected to the fixing member.

And/or, an upper end of the guide rod is connected to the fixing member, and a bottom end of the guide rod passes through the intermediate member and is connected to the base.

And/or, the elastic member is located above the intermediate member or below the intermediate member.

According to another aspect of the present invention, there is provided a capsule endoscope magnetic control system, comprising the suspension device described above. The capsule endoscope magnetic control system is used to control a capsule endoscope.

Optionally, the capsule endoscope magnetic control system is a mobile magnetic control system for capsule endoscope.

Optionally, the capsule endoscope magnetic control system comprises a magnetic control device and a suspension device, wherein the magnetic control device provides a controllable varying magnetic field, and the magnetic control device is connected to a suspension member of the suspension device.

Compared with the prior art, the present invention can achieve the following beneficial effects.

The suspension device in accordance with the present invention comprises a base, a suspension member, an intermediate member and an adsorption component, wherein the suspension member can be used to connect with a hanging object, at least part of the suspension member may be disposed in a pairing portion of the base, and at least part of the suspension member may abut against the pairing portion or be staggered to separate from the pairing portion, that is, at least part of the suspension member may form a constraint with the pairing portion. The intermediate member is disposed above the suspension member, and the adsorption component is disposed above the intermediate member. Such arrangement of the intermediate member and the adsorption component allows posture adjustment and posture locking of the suspension member, that is, the adsorption component can be used to control the posture adjustment or locking of the suspension member. Further, when the adsorption component has no adsorption force, the intermediate member can be pressed against the upper end of the suspension member to make at least part of the suspension member abut against the pairing portion, and the suspension member is locked at this point, that is in a locked state; when the adsorption component has the adsorption force, the adsorption force can drive the intermediate member to move vertically and thereby make at least part of the suspension member separate from the pairing portion. At this point, the posture of the suspension member can be adjusted, and the posture of the hanging object connected to the suspension member can be adjusted according to the direction of the center of gravity, so that the hanging object can adapt to changes in different environments.

The suspension device has a simple and compact structure and is easy to operate. It can adjust the posture of the hanging object, and can ensure the stability of a connection between the magnetic control device and a main body of the mobile magnetic control system during an examination, and thus can provide a guarantee for the operation or results of the examination.

The capsule endoscope magnetic control system in accordance with the present invention comprises the suspension device and has all the features and advantages of the suspension device described above, and can not be repeated here.

It should be understood that the above description and the details to be set forth in the following text are only exemplary, which are not intended to limit the invention.

MARKS

Figure 1:
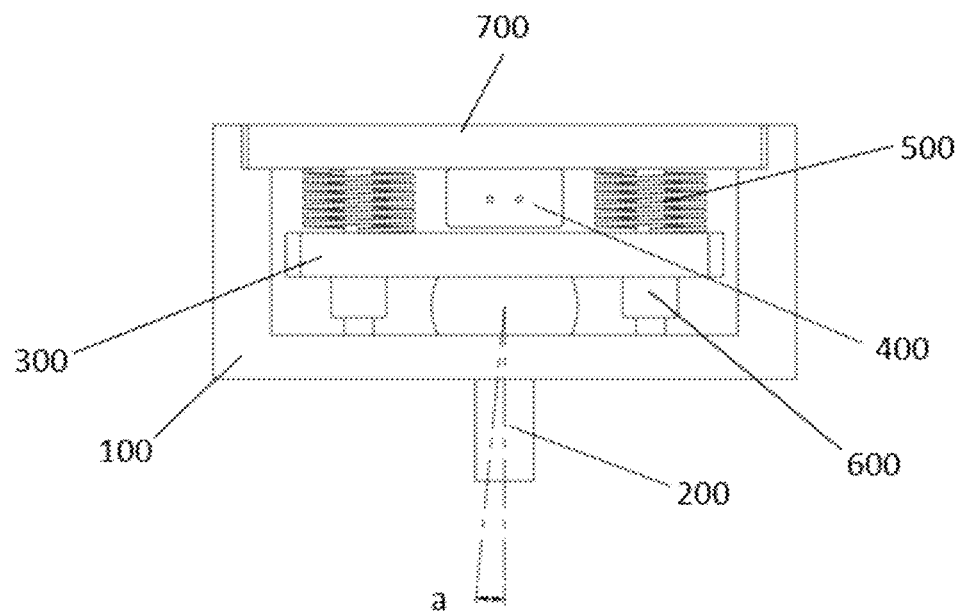
FIG. 1 shows a schematic view of a suspension device in accordance with the embodiments of the present invention.

100—Base; 101—Pairing portion;
200—Suspension member; 201—Ball head; 202—Ball bar;
300—Intermediate member;
400—Adsorption component; 401—Energized cable;
500—Elastic member;
600—Guide mechanism; 601—Guide rod; 602—Linear bearing;
700—Fixing member;
800—Screw;
Gap—b; Adjustment angle—a.

The drawings herein are incorporated in and constitute a part of the specification, illustrate the embodiments consistent with the present invention and are used together with the specification to explain the principles of the present invention.

DETAILED DESCRIPTION

In order to better understand technical solutions of the present application, embodiments of the present application are described in detail below in conjunction with the accompanying figures.

It should be clear that the embodiments described are only a portion of the embodiments of the present application. Based on the embodiments in the present application, all other embodiments obtained by a person of ordinary skill in the art without creative labor fall within the scope of protection of the present application.

In one specific embodiment, the present application is described in further detail below by way of specific embodiments and in conjunction with the accompanying figures.

It is understood by those skilled in the art that existing magnetic control systems such as a capsule endoscope magnetic control system need to be provided in a mobile form in order to meet needs of different patients, as stated in the background art. For example, a patent with publication number CN105615817A discloses a magnetic navigation device for medical capsule endoscope. The device designed with a movable base is a mobile magnetic system. A magnetic control device of the mobile magnetic system may comprise a hybrid magnetic field generator and a 5DOF (degree of freedom) motion mechanism. A main body of the magnetic system may comprise the movable base, and the magnetic control device is rigidly connected to the main body of the magnetic system. In this way, when the device moves or application scene varies, if the ground is uneven, the magnetic control device may be tilted, which affects stability of connection or effect of examination. For another example, a patent with publication number CN103222842A discloses a device and method for controlling movement of capsule endoscope in human alimentary canal, which comprises a base, a magnetic control device and a magnetic sphere. The base is arranged to change a position of the magnetic control device, and the magnetic sphere with an adjustable posture is mounted on the magnetic control device to provide an external magnetic field for the capsule endoscope. If the base is equipped with universal wheels, it can be a mobile magnetic control system, however, the magnetic control device of the mobile magnetic control system also needs to overcome a tilt problem caused by uneven ground in different environments. Moreover, it is necessary to ensure stability of connection between the magnetic control device and the main body (base) of the mobile magnetic control system during the examination.

Therefore, in order to overcome imperfections of the prior art and further meet current market demands, the present invention provides a suspension device and a capsule endoscope magnetic control system. By an arrangement of a suspension device in the capsule endoscope magnetic control system, and connecting a magnetic control device to a suspension member of the suspension device, a posture of the magnetic control device can be adjusted according to gravity so that it is always perpendicular to a local horizontal plane, and after the adjustment is completed, it can maintain good rigid connection between devices. The suspension device is simple in structure and convenient in operation.

The present invention is described in further detail below by some embodiments in conjunction with the accompanying drawings.

The present invention provides a capsule endoscope magnetic control system (not shown in FIGs) that can be used to control a capsule endoscope, comprising at least a capsule endoscope, a magnetic control device, and a suspension device. The magnetic control device provides a controlled variable magnetic field, which can drive movement of magnetically controlled capsule endoscope (e.g., capsule gastroscope) inside a subject, that is, the movement, posture and direction of the capsule endoscope entering the subject can be precisely controlled by the magnetic control device set outside the subject. The suspension device can be connected to the magnetic control device such that the magnetic control device can adjust the posture according to gravity, and be always perpendicular to the local horizontal plane.

The capsule endoscope integrates a magnet and an optical imaging system, etc., inside for visualizing digestive tract of the subject.

Specifically, the capsule endoscope magnetic control system can be a mobile magnetic control system for capsule endoscope. The magnetic control device can be connected to the suspension member of the suspension device, that is, the magnetic control device can be suspended below the suspension member, and therefore the posture of the magnetic control device can be adjusted, so that in different ground environment, the magnetic control device can still be perpendicular to the local horizontal plane.

Therefore, through an arrangement of a suspension device, the capsule endoscope magnetic control system disclosed herein can overcome the tilt problem with existing magnetic control device caused by the uneven ground in different environments, and also can guarantee the stability of the connection between the magnetic control device and the main body of the mobile magnetic control system during the examination.

In the description of this specification, it should be noted that the ground refers to ground environment (i.e., an environment may comprise, for example, slopes, undulations or curvatures, etc.) and the local horizontal plane refers to a plane perpendicular to a local vertical line (which may be a plumb line, a geographic vertical line, or a mass gravity vertical line).

It should be noted that compositions or structures of the capsule endoscope magnetic control system as illustrated in the embodiments of the present invention do not constitute a specific limitation on the capsule endoscope magnetic control system. For example, in some other embodiments of the present invention, the capsule endoscope magnetic control system may comprise more or fewer devices, or combine certain components, or disassemble certain components, or arrange different components. For example, the capsule endoscope magnetic control system comprises a capsule endoscope, a magnetic control device and a suspension device, and can further comprises other components known to the prior art such as universal wheels. The present invention does not make special limitations on other devices or components and connection relationship. The core of the capsule endoscope magnetic control system comprises the suspension device as described herein.

It should be appreciated that, in the embodiments of the present invention, the specific structure of the capsule endoscope and the magnetic control device is not limited. In addition, what is not described in detail in the above description of the capsule endoscope magnetic control system are common structures or connections that can easily be thought of by those skilled in the art and can be adjusted with reference to the prior art or by those skilled in the art according to actual situations, so that a detailed description can be omitted.

The specific structure of the suspension device can be further described as follows.

It should be understood that the suspension device in some embodiments of the present invention is not limited to be applied on the capsule endoscope magnetic control system, but can also be applied on apparatus other than the capsule endoscope magnetic control system. That is, the suspension member of the suspension device may be connected to the magnetic control device or to other hanging objects for adjusting postures of other hanging objects. For convenience of description, the embodiments of the present invention mainly take the hanging object as the magnetic control device as an example to describe the suspension device in detail. However, it can be appreciated and by those skilled in the art that the principles of the present invention can be implemented in any suitably arranged hanging objects. In addition, for clarity and conciseness, descriptions of well-known functions or effects may be omitted.

Figure 2:
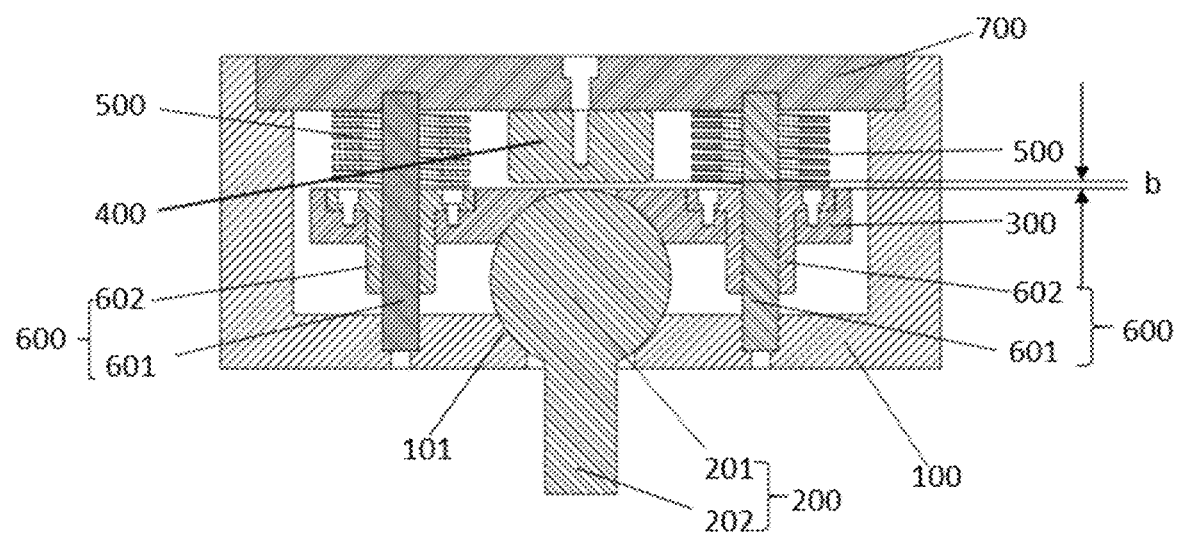
FIG. 2 shows a sectional view of the suspension device in accordance with the embodiments of the present invention.
Figure 3:
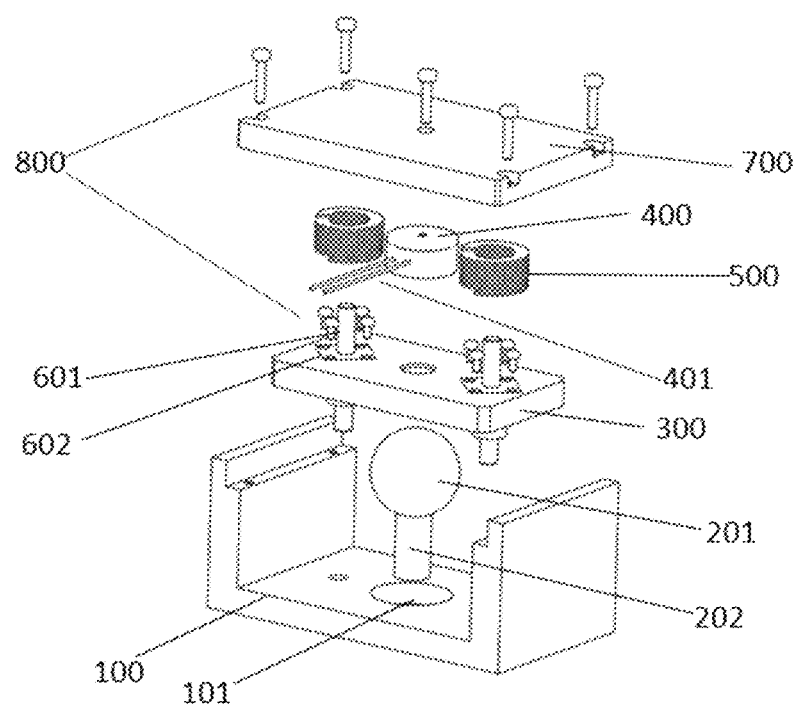
FIG. 3 shows an exploded view of the suspension device in accordance with the embodiments of the present invention.

Specifically, as depicted in FIG. 1 to FIG. 3, in some embodiments, a suspension device is provided, comprising:

a base 100, comprising a pairing portion 101;

a suspension member 200, where at least part of the suspension member 200 is disposed within the base 100;

an intermediate member 300, where the intermediate member 300 is pressed at an upper end of the suspension member 200; and an adsorption component 400, which is disposed above the intermediate member 300;

where, when the adsorption component 400 has no adsorption force, the intermediate member 300 is pressed against the upper end of the suspension member 200 so that at least part of the suspension member 200 abuts against the pairing portion 101 and the suspension member 200 is locked; when the adsorption component 400 has an adsorption force, the intermediate member 300 is driven to move vertically so that at least part of the suspension member 200 is separated from the pairing portion 101 and a posture of the suspension member 200 is appropriate for adjustment.

The suspension device comprises a base 100, a suspension member 200, an intermediate member 300 and an adsorption component 400. Where, the suspension member 200 may be used to connect to a hanging object (not shown in FIGs), at least part of the suspension member 200 may be disposed in the base 100, and the pairing portion 101 in the base 100 may fit with or constrain the suspension member 200, where at least part of the pairing portion 101, and the suspension member 200 is in a locked state or in a posture locked state (i.e., the suspension member 200 cannot move relative to the base 100); or at least part of the suspension member 200 may be staggered to separate from the pairing portion 101 (for example, a gap between the two), and the suspension member 200 is in a unlocked state or in a posture adjustable state (i.e., the suspension member 200 can move relative to the base 100), that is, at least part of the suspension member 200 may form a constraint with the pairing portion 101. The intermediate member 300 may be disposed above the suspension member 200, and at least part of a bottom end of the intermediate member 300 is in contact with or abuts against at least part of a top end of the suspension member 200. The adsorption component 400 is disposed above the intermediate member 300. Such arrangement of the intermediate member 300 and the adsorption component 400 allows posture adjustment and posture locking of the suspension member 300, that is, the adsorption component 400 can be used to control the posture adjustment or locking of the suspension member 200. When the adsorption component 400 has an adsorption force, the posture of the hanging object can be adjusted according to the direction of the center of gravity, and when the adjustment is completed, the adsorption component 400 can be controlled to apply no adsorption force, so that the adjusted posture is locked.

In practice, for one thing, when the adsorption component 400 has an adsorption force, the adsorption force can drive the intermediate member 300 to move vertically, e.g moving in a direction close to the bottom of the adsorption component 400, and thereby make at least part of the suspension member 200 separate from the pairing portion 101, that is, the suspension member 200 is in an unlocked state. At this point, the posture of the suspension member 200 can be adjusted, and the posture of the hanging object connected to the suspension member 200 can be adjusted according to the direction of the center of gravity, so that the suspension can adapt to changes in different environments. That is, even if the suspension device is slightly tilted or not perpendicular to the ground, the hanging object suspended from the suspension member 200 can still be perpendicular to the local horizontal plane. For another, after posture adjustment, the adsorption force of the adsorption component is eliminated, and then the intermediate member can press against the top of the suspension member to make at least part of the suspension member 200 abut against the pairing portion 101 to constrain the suspension member 200. At this point, the suspension member 200 is locked, i.e. in a locked state.

The suspension device has a simple and compact structure and is easy to operate. It can adjust the posture of the hanging object, and can ensure the stability of a connection between the magnetic control device and the main body of the mobile magnetic control system during an examination, and thus can provide a guarantee for the operation or results of the examination.

Optionally, the suspension member 200 comprises a limit portion. The limit portion of the suspension member 200 is fitted or constrained to the pairing portion 101 of the base 100. The limit portion of the suspension member 200 may abut against the pairing portion 101 of the base 100, and the suspension member 200 is in a locked state or in a posture locked state at this point; or the limit portion of the suspension member 200 may be staggered to separate from the pairing portion 101, and the suspension member 200 is in a unlocked state or in a posture adjustable state at this point. It should be understood that at least part of the suspension member 200 may be formed as the limit portion, and the limit portion may be an outer surface of a certain part of the suspension member 200.

To make the suspension easy to adjust its posture under the action of gravity, the suspension device may utilize a ball hinge structure, which has the characteristics of flexible and accurate control, easy adjustment, convenient installation and reliable safety. In some embodiments, as described in FIG. 2, the suspension member 200 comprises a ball bar 202 and a ball head 201, where one end of the ball bar 202 is provided with the ball head 201 and the other end of the ball bar 202 extends outside the base 100; the ball head 201 is at least partially disposed in the base 100 and the intermediate member 300 is pressed against an upper end of the ball head 201.

In accordance with the embodiments of the present invention, the suspension member 200 may comprise the ball head 201 and the ball bar 202, wherein the ball head 201 and the ball bar 202 are interconnected, one end of the ball bar 202 may be fixedly connected to the ball head 201, the other end of the ball bar 202 may be a free end or used to connect to the hanging object, and at least part of the ball bar 202 or all of the ball bar 202 may be disposed outside the base 100. The ball head 201 may be at least partially located in the pairing portion 101 of the base 100, the ball bar 202 may pass through the pairing portion 101 of the base 100 and extend outside the base 100, and may be connected to the hanging object through the ball bar 202.

In some embodiments, as described in FIG. 2 or FIG. 3, the pairing portion 101 of the base 100 is a ball groove, and the ball head 201 is at least partially located in the ball groove. The pairing portion 101 may be a cavity for holding the ball head 201. The ball groove may be a spherical groove or a hemispherical groove, and the ball head 201 may be at least partially located in the ball groove. Further, an outer surface of a lower portion of the ball head 201 may fit with at least part of an inner surface of the ball groove, that is, the outer surface of the lower portion of the ball head 201 may abut against or separate from at least part of the inner surface of the ball groove. When the adsorption component 400 has no adsorption force, the suspension member 200 is restricted from rotating about the ball center in the ball groove of the base 100, and when the adsorption component 400 has a adsorption force, the suspension member 200 can rotate about the ball center in the ball groove of the base 100.

Optionally, the pairing portion 101 of the base 100 may also be a stepped groove (not shown in FIGs) or a stepped hole (not shown in FIGs). An upper portion of the stepped groove or the stepped hole may fit the outer surface of the lower portion of the ball head 201, and a diameter of a lower portion of the stepped groove or the stepped hole may be smaller than a diameter of the upper portion of the stepped groove or stepped hole.

It can be understood that the suspension member 200 and the base 100 may form a ball hinge structure, that is, the ball hinge structure comprises a suspension member 200 and a base 100, where, the suspension member 200 comprises a ball head 201 and a ball bar 202 (may also be referred to as a ball hinge bar), and the base 100 may also be referred to as a hinge base or a ball hinge base, and the base 100 is provided with a ball groove that fits with the ball head 201, and the ball head 201 of the suspension member 200 and the ball groove of the base 100 can form a constraint. Therefore, when the suspension device is perpendicular to the local horizontal plane, the ball hinge structure may be used. The spherical structure (ball head 201) of the suspension member 200 and the pairing portion 101 of the base 100 (ball groove) form a constraint, which enables the hanging object to adjust its posture under gravity. The structure has the characteristics of flexible and accurate control, easy adjustment, convenient installation, and reliable safety.

Optionally, the intermediate member 300 may also be a pressing plate, the intermediate member 300 is disposed on the upper end of the ball head 201, and a bottom surface of the intermediate member 300 may have a cavity for holding the ball head 201, i.e., the bottom surface of the intermediate member 300 may have a cavity or a ball groove fitting the upper end of the ball head 201. Therefore, when the adsorption component has no adsorption force, the intermediate member 300 can be pressed against the upper end of the ball head 201.

In some embodiments, the adsorption component 400 comprises an electromagnetic chuck, and the electromagnetic chuck has a adsorption force when energized and has no adsorption force when de-energized.

In accordance with the embodiments of the present invention, the adsorption component 400 may be an electromagnetic chuck, but it is not limited to this. More generally, the adsorption component 400 may also be other member with a adsorption function. When energized, the electromagnetic chuck has an adsorption force, and when de-energized, the electromagnetic chuck has no adsorption force. Therefore, an electromagnetic chuck can be used for the posture adjustment and posture locking of the hanging object. On the one hand, when the electromagnetic chuck is energized, the hanging object can adjust its posture according to the direction of the center of gravity; on the other hand, after the adjustment is completed, the electromagnetic chuck is de-energized to lock the adjusted posture. In this way, the suspension device is convenient to operate, easy to control, and has good reliability.

In some embodiments, as described in FIG. 3, the electromagnetic chuck (adsorption component 400) may be connected to an external power supply (not shown in FIGs) or a power button (not shown in FIGs) through an energized cable 401. The specific method of controlling the posture adjustment of a hanging object using an electromagnetic chuck may be doing so by a self-reset power button, i.e. controlling the electromagnetic chuck to power on or power off through the power button, which is easy to control for the operator.

It should be noted that the embodiments of the present invention do not limit the shape or form of the electromagnetic chuck, which may be rectangular, circular or other shapes, etc. The exemplary electromagnetic chuck shown in the accompanying drawings does not constitute a limitation of the electromagnetic chuck, and more generally, the electromagnetic chuck may have any structural form.

The embodiments of the present invention does not limit the current in the electromagnetic chuck, which may be either alternating current or direct current.

In order to enable the intermediate member 300 to be pressed against the upper end of the suspension member 200, an elastic member 500 may be disposed above the intermediate member 300 to provide an elastic force, which in turn enables the intermediate member 300 to be pressed against the upper end of the suspension member 200 and lock the suspension member 200 when the electromagnetic chuck is de-energized. In some embodiments, as described in FIG. 2 or FIG. 3, the suspension device comprises at least one elastic member 500, and the elastic force of the at least one elastic member 500 acting on the intermediate member 300 may cause the suspension member 200 and the pairing portion 101 to abut against each other. The elastic member 500 is so disposed that, on the one hand, when the adsorption component 400 has no adsorption force, the elastic force acting on the intermediate member 300 by the elastic member 500 can drive the intermediate member 300 to press against the upper end of the suspension member 200; on the other hand, when the adsorption component 400 has an adsorption force, the adsorption force is greater than the elastic force of the elastic member 500, so that it can overcome the elastic force of the elastic member 500 and drive the intermediate member 300 to move vertically.

Further, a position where the elastic member is disposed may be of various types. Specifically, in some embodiments, the at least one elastic member 500 described above may be disposed above the intermediate member 300; in other embodiments, the at least one elastic member 500 described above may also be disposed below the intermediate member 300.

In an example, as described in FIG. 1 or FIG. 2, the suspension device may comprise two elastic members 500. Both of the two elastic members 500 may be disposed above the intermediate member 300, and they are disposed on two sides of the electromagnetic chuck. In addition, in some other embodiments, the two elastic members 500 may also be disposed below the intermediate member 300, as long as the force acting on the intermediate member 300 by the elastic members 500 can make the suspension member 200 and the pairing portion 101 abut against each other, and the shape, structure and position of the elastic members 500 illustrated in the accompanying drawings of the present invention do not constitute a specific limitation of the elastic members 500.

It should be understood that the embodiments of the present invention do not limit the number, structure, connection position, etc., of the elastic members 500, which may be two or more, and may be of any shape, and may be connected above or below the intermediate member 300. The number or structural form of the elastic members 500 illustrated exemplarily in the accompanying drawings does not constitute a limitation of the elastic members 500, and more generally, the elastic member 500 may have any structural form.

Therefore, when the suction member 400, such as an electromagnetic chuck, has no adsorption force, the elastic force by the elastic member 500 can drive the intermediate member 300 to press against the upper end of the suspension member 200; when the adsorption component 400 has an adsorption force, the adsorption force can overcome the elastic force of the elastic member 500 and drive the intermediate member 300 to move vertically. As a result, the suspension device is simple in structure, firm and reliable, and convenient to control.

Optionally, the elastic member 500 comprises a variety of elastic elements that can provide the elastic force, such as a spring, a compression spring, a wire spring, a torsion spring, a leaf spring, a spring piece, etc. The elastic member 500 may be disposed above the intermediate member 300.

Optionally, the elastic member 500 may also be a tension spring, which may be disposed below the intermediate member 300.

In order to keep the movement of the intermediate member 300 from deflecting, a guide mechanism 600 may be disposed in the suspension device, to provide a guiding effect to the intermediate member 300. Specifically, in some embodiment, as described in FIG. 2 or FIG. 3, the suspension device comprises a guide mechanism 600, the guide mechanism 600 comprises a guide rod 601, and the guide rod 601 is sleeved with the elastic member 500; the intermediate member 300 is fit for moving along an axial direction of the guide mechanism 600, i.e., the intermediate member 300 can move vertically up and down along the guide rod 601 of the guide mechanism 600. The guide rod 601 may pass through the intermediate member 300, and an upper end of the guide rod 601 may be sleeved with the elastic member 500. After the guide rod 601 passes through the intermediate member 300, its bottom end may be connected to the base 100.

It should be understood that the guide mechanism 600 may comprises a guide rod 601, and the guide rod 601 may also be replaced with a guide rail, that is, the intermediate member 300 may move along an axial direction of the guide rail.

Optionally, there are two elastic members 500. The two elastic members 500 are distributed on both sides of the adsorption component 400, and the two elastic members 500 are respectively sleeved on the two guide rods 601.

Further, as described in FIG. 2 or FIG. 3, the guide mechanism 600 comprises a guide rod 601 and a sliding seat. The sliding seat is disposed on the intermediate member 300, and is mounted on the guide rod 601, and the sliding seat is slidably connected to the guide rod 601.

The intermediate member 300 and the sliding seat are fit for moving linearly along the axial direction of the guide rod 601.

In accordance with the embodiments of the present invention, the suspension device may comprises a guide mechanism 600 for providing a certain guiding effect for the movement of the intermediate member 300. The guide mechanism 600 may comprises a guide rod 601 and a sliding seat slidably connected to the guide rod 601, wherein the sliding seat may be mounted on the intermediate member 300, the sliding seat may have a through hole, the guide rod 601 may penetrate the through hole of the sliding seat, and an inner wall surface of the through hole may be slidably connected to an outer surface of the guide rod 601. In this way, when the adsorption component 400 has a adsorption force, the intermediate member 300 and the sliding seat disposed on the intermediate member 300 can be moved upward along the guide rod 601.

In some embodiments, the sliding seat may be a linear bearing 602, but it is not limited to this, and the sliding seat may also be other structures that can fit the guide rod 601. The linear bearing 602 may be fixedly mounted on the intermediate member 300, and the linear bearing may have a bearing hole, and an inner wall surface of the bearing hole may be slidingly connected to the outer surface of the guide rod 601. In this way, the structure is simple, easy to install and operate, and reliable in connection.

Optionally, the linear bearing 602 is connected to the intermediate member 300 by screws 800.

In some embodiments, as depicted in FIG. 1, FIG. 2 or FIG. 3, the suspension device comprises a fixing member 700 and the fixing member 700 is connected to the base 100 to form a holding cavity. The adsorption component 400, the intermediate member 300 and at least part of the suspension member 200 are disposed in the holding cavity, and the adsorption component 400 is fixedly mounted on the fixing member 700. Further, the adsorption component 400, the elastic member 500, the guide mechanism 600, the intermediate member 300 and at least part of the suspension member 200 can all be arranged in the holding cavity, wherein the ball head 201 of the suspension member 200 may be disposed in the holding cavity, and the ball bar 202 of the suspension member 200 may extend outside the holding cavity. In this way, the structure is simple and compact, easy to install and disassemble, and can achieve a safe protection of internal parts of the holding cavity such as the electromagnetic chuck, etc.

In accordance with the embodiments of the present invention, the fixing member 700 may also be a limit plate, which may be used to fix the adsorption component 400 or the elastic member 500. That is, both an upper end of the adsorption component 400 and an upper end of the elastic member 500 may be connected to the fixing member 700.

In some embodiments, the upper end of the guide rod 601 is connected to the fixing member 700, and a bottom end of the guide rod 601 passes through the middle member 300 and is connected to the base 100.

Optionally, the base 100 is connected to the fixing member 700 by screws 800.

Optionally, an upper end of the electromagnetic chuck is connected to the fixing member 700 by screws 800.

In some embodiments, the upper end of the electromagnetic chuck (adsorption component 400) is connected to the fixing member 700; a bottom end of the electromagnetic chuck is near an upper end surface of the intermediate member 300. It should be understood that when the electromagnetic chuck has no adsorption force, there may be a gap between the bottom end of the electromagnetic chuck and the upper end surface of the intermediate member 300; and when the electromagnetic chuck has an adsorption force, the bottom end of the electromagnetic chuck may be close to or in contact with the upper end surface of the intermediate member.

Further, as described in FIG. 2, there is a gap b between the bottom end of the electromagnetic chuck and the upper end surface of the intermediate member 300, and the gap b may be a distance that the intermediate member 300 can move upward. In general, the gap b should not be too large, as long as it is enough to allow at least part of the ball head 201 of the suspension member 200 to separate from the ball groove of the base 100, so that the suspension member 200 can rotate about the center of the ball in the ball groove of the base 100. Further, as described in FIG. 1, an adjustment angle range of the hanging object can be determined according to actual situation. For example, the adjustment angle range of the hanging object can be within a cone surface with a cone angle of 2a, and a is the adjustment angle.

Specifically, as a preferred embodiment of the present invention, the suspension device comprises a base 100, a suspension member 200, an intermediate member 300, an adsorption component 400, a guide mechanism 600, an elastic member 500 and a fixing member 700, where the base 100 comprises a pairing portion 101, the pairing portion 101 may be a ball groove, the suspension member 200 comprises a ball head 201 and a ball bar 202, the adsorption component 400 may be an electromagnetic chuck, the elastic member 500 may be a spring, and the guide mechanism 600 may comprises a linear bearing 602 and a guide rod 601.

The fixing member 700 is connected to the base 100 by screws 800 to form a holding cavity. The electromagnetic chuck, the intermediate member 300, the spring, the linear bearing 602, the guide rod 601, and the ball head 201 of the suspension member 200 can be arranged in the holding cavity, and the ball bar 202 of the suspension member 200 can extend outside the holding cavity. The upper end of the electromagnetic chuck and an upper end of the spring can be respectively connected to the fixing member 700, the intermediate member 300 is disposed below the electromagnetic chuck and the spring, and the intermediate member 300 is pressed against the upper end of the ball head 201. The guide rod 601 is sleeved with a spring, the upper end of the guide rod 601 is connected to the fixing member 700, and the bottom end of the guide rod 601 passes through the intermediate member 300 and is connected to the base 100. The linear bearing 602 may be fixedly mounted on the intermediate member 300, the linear bearing 602 may have a bearing hole, and the inner wall surface of the bearing hole may be slidably connected to the outer surface of the guide rod 601.

In actual use, a hanging object, such as a magnetic control device, can be suspended below the suspension member 200. When the electromagnetic chuck is not energized, the electromagnetic chuck has no adsorption force. Under the force of the spring, the intermediate member 300 and the linear bearing 602 can press against the upper end of the ball head 201 of the suspension member 200 downward along the guide rod 601, so that the rotation of the bottom end of the ball head 201 of the suspension member 200 around the ball center of the ball groove in the base is restricted. When the electromagnetic chuck is energized, the electromagnetic chuck has an adsorption force, and the adsorption force of the electromagnetic chuck can be used to overcome the force of the spring. The intermediate member 300 and the linear bearing 602 can move upward a small distance along the guide rod 601. For example, the movement distance of the intermediate piece 300 and the linear bearing 602 can be the gap b. At this point, the suspension member 200 can rotate about the ball center of the ball groove in the base 100, and the posture of the hanging object connected to the suspension member 200 is adjusted by the force of the center of gravity. For example, the adjustment angle range of the hanging object can be within a cone surface with a cone angle of 2a. When the adjustment is over, the electromagnetic chuck can be powered off, and the posture of the hanging object is restricted by the force of the intermediate member pressing on the hanging object.

As a result of the arrangement of the base 100, the suspension member 200, the intermediate member 300, the adsorption component 400, the elastic member 500, the guide mechanism 600, and the fixing member 700, the suspension device can be designed to be more compact in structure, thus easy to control, install and disassemble. It can adjust the posture of the hanging object, and can ensure the stability of a connection between the magnetic control device and the main body of the mobile magnetic control system during an examination, and thus can provide a guarantee for the operation or results of the examination. Therefore, the tilt problem with the existing magnetic device that is caused by the uneven ground in different environments and needs to be overcome is effectively alleviated.

The person skilled in the art realizes that the present invention by no means is limited to the preferred embodiments described above. On the contrary, many modifications and variations are possible within the scope of the appended claims. Any modifications, equivalent substitutions, improvements, etc. made within the spirit and principles of this disclosure are intended to be included within the scope of the present invention.

The invention claimed is:

1. A suspension device, comprises:
a base, comprising a pairing portion;
a suspension member, wherein at least part of the suspension member is disposed within the base;
an intermediate member, which is pressed at an upper end of the suspension member; and an adsorption component, which is disposed above the intermediate member;

wherein, when the adsorption component has no adsorption force, the intermediate member is pressed against the upper end of the suspension member so that at least part of the suspension member abuts against the pairing portion and the suspension member is locked; when the adsorption component has an adsorption force, the intermediate member is driven to move vertically so that at least part of the suspension member can be separated from the pairing portion and a posture of the suspension member is appropriate for adjustment, wherein the suspension device comprises a guide mechanism, the guide mechanism comprises a guide rod and a sliding seat, the sliding seat is disposed on the intermediate member and is mounted on the guide rod, wherein the sliding seat is slidably connected to the guide rod;

the intermediate member and the sliding seat are fit for moving linearly along an axial direction of the guide rod.

2. The suspension device of claim 1, wherein the suspension device comprises at least one elastic member, and the at least one elastic member applies an elastic force on the intermediate member such that the suspension member and the pairing portion abut against each other; and wherein when the adsorption component has no adsorption force, the elastic force of the elastic member is fit for driving the intermediate member to press against the upper end of the suspension member;

when the adsorption component has the adsorption force, the adsorption force overcomes the elastic force of the elastic member and drives the intermediate member to move vertically.

3. The suspension device of claim 2, wherein the suspension device comprises a guide mechanism, the guide mechanism comprising a guide rod, the guide rod is sleeved with the elastic member;

the intermediate member is fit for moving along an axial direction of the guide mechanism.

4. The suspension device of claim 1, wherein the sliding seat comprises a linear bearing.

5. The suspension device of claim 1, wherein the suspension device comprises a fixing member that is connected to the base to form a holding cavity; wherein, the adsorption component, the intermediate member and at least part of the suspension member are arranged in the holding cavity, and the adsorption component is fixedly mounted on the fixing member.

6. The suspension device of claim 1, wherein the suspension member comprises a ball bar and a ball head, one end of the ball bar is provided with the ball head and the other end of the ball bar extends outside the base;

the ball head is at least partially disposed in the base and the intermediate member is pressed against an upper end of the ball head.

7. The suspension device of claim 6, wherein the pairing portion of the base is a ball groove, and the ball head is at least partially located in the ball groove;

or, the pairing portion of the base is a stepped groove or a stepped hole, and the upper portion of the stepped groove or the stepped hole fit an outer surface of a lower portion of the ball head.

8. The suspension device of claim 1, wherein the adsorption component comprises an electromagnetic chuck, and the electromagnetic chuck has the adsorption force when energized and the electromagnetic chuck has no adsorption force when de-energized.

9. The suspension device of claim 1, wherein the suspension device further comprises an elastic member, a guide mechanism and a fixing member, and the guide mechanism comprises a guide rod and a sliding seat;

the base is connected to the fixing member to form a holding cavity, the intermediate member, the adsorption component, the elastic member, the guide mechanism and part of the suspension member are all arranged in the holding cavity, and a remaining part of the suspension member is fit for extending outside the holding cavity through the pairing portion;

the adsorption component is disposed above the intermediate member, the intermediate member is pressed at the upper end of the suspension member, the intermediate member is provided with the sliding seat, and the sliding seat is mounted on the guide rod, the sliding seat is slidably connected to the guide rod, and the guide rod is sleeved with the elastic member.

10. The suspension device of claim 9, wherein an upper end of the adsorption component is fixedly connected to the fixing member;

and/or, an upper end of the guide rod is connected to the fixing member, and a bottom end of the guide rod passes through the intermediate member and is connected to the base;

and/or, the elastic member is located above the intermediate member or below the intermediate member.

11. A capsule endoscope magnetic control system, comprises a suspension device, comprising:

a base, comprising a pairing portion;

a suspension member, wherein at least part of the suspension member is disposed within the base;

an intermediate member, which is pressed at an upper end of the suspension member; and an adsorption component, which is disposed above the intermediate member;

wherein, when the adsorption component has no adsorption force, the intermediate member is pressed against the upper end of the suspension member so that at least part of the suspension member abuts against the pairing portion and the suspension member is locked; when the adsorption component has an adsorption force, the intermediate member is driven to move vertically so that at least part of the suspension member can be separated from the pairing portion and a posture of the suspension member is appropriate for adjustment, wherein the suspension device comprises a guide mechanism, the guide mechanism comprises a guide rod and a sliding seat, the sliding seat is disposed on the intermediate member and is mounted on the guide rod, wherein the sliding seat is slidably connected to the guide rod;

the intermediate member and the sliding seat are fit for moving linearly along an axial direction of the guide rod.

12. The system of claim 11, wherein the capsule endoscope magnetic control system further comprises a magnetic control device, wherein the magnetic control device provides a controllable varying magnetic field, and the magnetic control device is connected to the suspension member of the suspension device.

13. The system of claim 11, wherein the capsule endoscope magnetic control system is a mobile magnetic control system for capsule endoscope.

14. The system of claim 11, wherein the suspension device comprises at least one elastic member, and the at least one elastic member applies an elastic force on the intermediate member such that the suspension member and the pairing portion abut against each other; and wherein
   when the adsorption component has no adsorption force, the elastic force of the elastic member is fit for driving the intermediate member to press against the upper end of the suspension member;
   when the adsorption component has the adsorption force, the adsorption force overcomes the elastic force of the elastic member and drives the intermediate member to move vertically.

15. The system of claim 14, wherein the suspension device comprises a guide mechanism and two elastic members, the two elastic members are distributed on both sides of the adsorption component and are respectively sleeved on the guide mechanism.

16. The system of claim 11, wherein the suspension device comprises a guide mechanism, the guide mechanism comprises a guide rod and a sliding seat, the sliding seat is disposed on the intermediate member and is mounted on the guide rod, wherein the sliding seat is slidably connected to the guide rod;
   the intermediate member and the sliding seat are fit for moving linearly along an axial direction of the guide rod.

17. The system of claim 11, wherein the suspension member comprises a ball bar and a ball head, one end of the ball bar is provided with the ball head and the other end of the ball bar extends outside the base;
   the ball head is at least partially disposed in the base and the intermediate member is pressed against an upper end of the ball head.

18. The system of claim 11, wherein the adsorption component comprises an electromagnetic chuck, and the electromagnetic chuck has the adsorption force when energized and the electromagnetic chuck has no adsorption force when de-energized.

19. The system of claim 11, wherein the suspension device further comprises an elastic member, a guide mechanism and a fixing member, and the guide mechanism comprises a guide rod and a sliding seat;
   the base is connected to the fixing member to form a holding cavity, the intermediate member, the adsorption component, the elastic member, the guide mechanism and part of the suspension member are all arranged in the holding cavity, and a remaining part of the suspension member is fit for extending outside the holding cavity through the pairing portion;
   the adsorption component is disposed above the intermediate member, the intermediate member is pressed at the upper end of the suspension member, the intermediate member is provided with the sliding seat, and the sliding seat is mounted on the guide rod, the sliding seat is slidably connected to the guide rod, and the guide rod is sleeved with the elastic member.

* * * * *